Aug. 23, 1927.
C. STILES
SIGNAL
Filed June 20, 1925   2 Sheets-Sheet 2
1,639,907
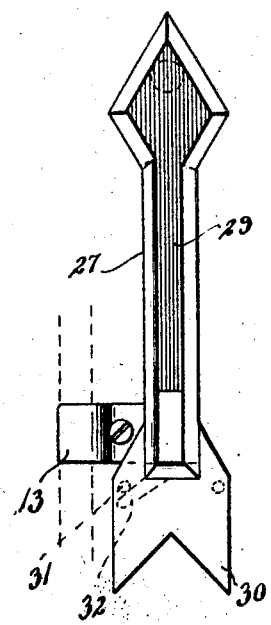
Fig. 3.
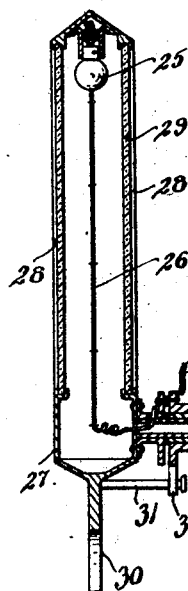
Fig. 4.
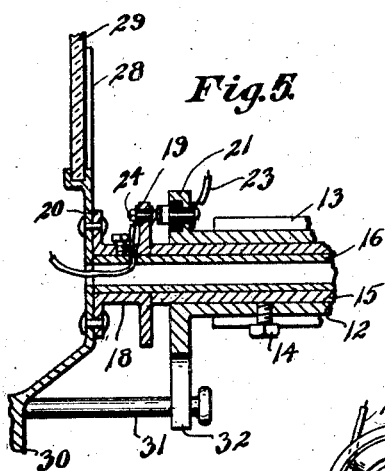
Fig. 5.
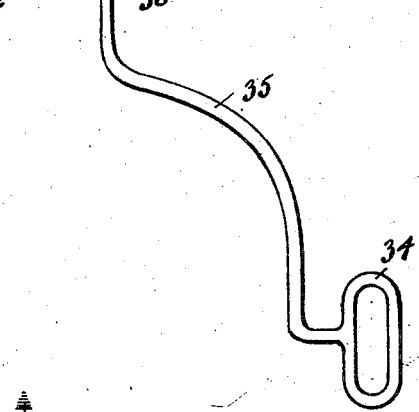
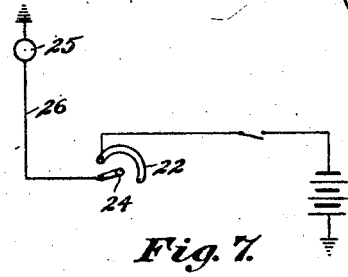
Fig. 6.   Fig. 7.
Charles Stiles,
INVENTOR
BY Victor J. Evans,
ATTORNEY
WITNESS:

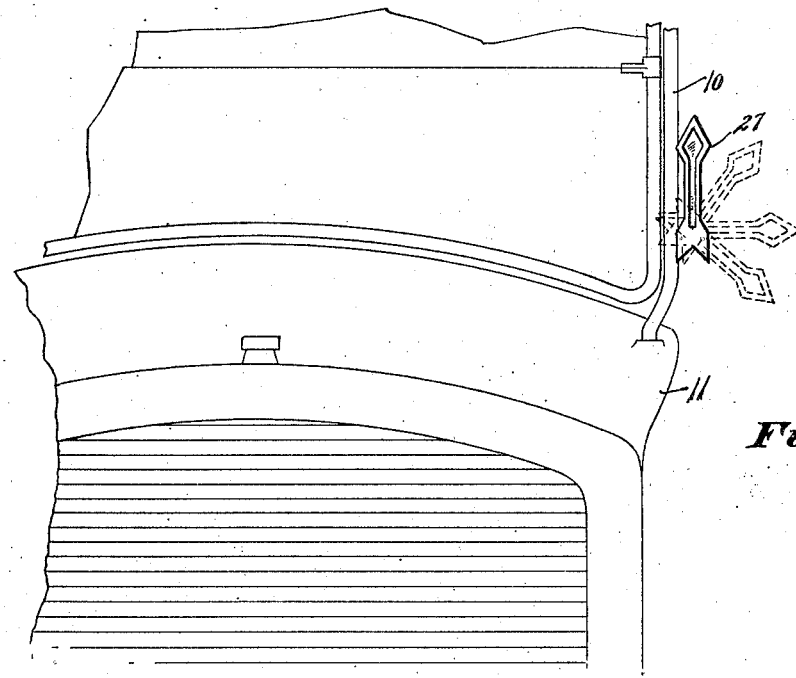
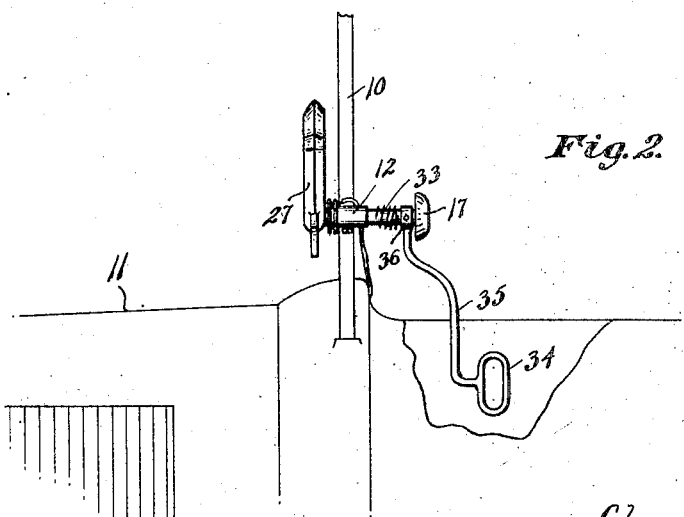

Patented Aug. 23, 1927.

1,639,907

UNITED STATES PATENT OFFICE.

CHARLES STILES, OF ALTOONA, KANSAS.

SIGNAL.

Application filed June 20, 1925. Serial No. 38,520.

This invention relates to improvements in signals for use upon motor vehicles and the like and contemplates the provision of a sleeve and casing which may be readily and easily attached to the wind-shield frame or to the corner post in a closed car and which includes an illuminated signal upon the outer end and a hand operating wheel upon the inner end in order that the signal may be brought into the desired angle in giving the correct signal from the inside of the automobile.

Another object of my invention is the provision of an arcuate shaped contact member carried upon the forward end of the fixed sleeve and which is adapted to engage a moving contact carried upon the inner side of the signal in order that the signal may be illuminated at the desired angle.
A further object of the invention is the provision of a stop interposed between the lower end of the signal and the fixed sleeve for limiting the movement thereof and a spring encircling the rigid sleeve and connected to the movable shaft in order that the signal will be brought back to its normal position and I further include a knee pedal connected with the hand wheel and which may have its lower end placed in juxtaposition with the normal position of the driver's knee in order that the driver may operate the signal by a slight pressure from his knee.

With the above and other objects in view, the invention further includes the following novel features and details of construction, to be hereinafter more fully described, illustrated in the accompanying drawings and pointed out in the appended claim.

In the drawings:—
Figure 1 is a fragmentary front elevation of an automobile showing my present invention applied thereto.

Figure 2 is a side elevation of an automobile and my invention applied thereto.
Figure 3 is an elevation of my signal arm per se.

Figure 4 is a vertical sectional view thereof.

Figure 5 is an enlarged sectional view of the connection between the fixed sleeve, operating sleeve and signal.

Figure 6 is a front elevation of the outer end of the fixed sleeve and contact.

Figure 7 is a diagrammatic plan view of the electrical circuit connected therewith.

Referring to the drawings in detail, wherein like characters of reference denote corresponding parts, I have shown my invention applied to a wind-shield frame 10 of a touring or open car 11 for purposes of illustration only, it being understood that I do not limit myself to open cars in the application of my invention but which may also be applied to closed models of cars with the same degree of efficiency in so far as the same may be inserted within an opening provided in the left front corner post of the closed car and operated in the same manner as it would when applied to the open car and upon the wind-shield frame 10.

The invention residing in the provision of a relatively short sleeve 12 having a clamp 13 encircling its outer side and held rigidly thereto through the instrumentality of a set screw 14 and which is adapted to have its opposite end clamped around a portion of the windshield frame 10. Arranged within the sleeve 12 is a bearing sleeve 15 which is also held rigidly secured with the sleeve 12 through the instrumentality of a set screw 14 and which bearing sleeve receives therein a rotary sleeve 16 having a hand operated wheel 17 upon its inner end, fixed to its outer end is a collar 18 having large and small annular flanges 19 and 20 provided upon the opposite ends thereof. The outer end of the sleeve 12 also includes an annular flange 21 which is arranged in spaced relation with respect to the inner side of the large annular flange 19 provided upon the collar 18 and this annular flange includes upon its outer side a semi-circular contact member 22 connected with a conducting wire 23 which leads to the ignition system of the automobile and which is adapted for selective engagement with the contact member 24 carried upon the inner side of the relatively large annular flange 19 and which in turn is connected with an incandescent lamp bulb 25 through the instrumentality of a conducting wire 26 extending within a lamp casing 27 having openings in the nature of slots 28 upon the opposite sides thereof and which includes glass, celluloid or other panels 29 positioned against these openings 28 and said panels are preferably colored red in order that the signal given thereby will be readily and easily seen by motorists in the front and rear of the vehicle. The lower portion of the lamp casing 27 includes a tail 30 which corresponds to the tail of an arrow and which includes upon the opposite side and in spaced parallel relation thereon a pair of pins 31, the purpose of which will be presently apparent. The annular flange 21 has included upon its lower side a lug member 32 arranged between the pins 31 and adapted for contacting relation therewith in order to restrict the rocking movement of the lamp casing 27.

It will thus be noted from the foregoing description and accompanying drawings that after my invention has been so applied to the wind-shield frame 10 in the manner described that the operator of the vehicle when so desirous of giving a signal and moving the lamp casing or signal to the proper and desired position for the respective signals will merely turn the hand wheel 17 and in so doing the rotary shaft 16, owing to its fixed connection with the collar 18 and which in turn has its small annular flange 20 secured to the inner side of the lamp casing 27, will cause the latter to move in the position so desired, and in so doing it will be noted that the contact member 24 carried upon the inner side of the relatively large annular flange 19 will be caused to be brought into contacting relation and slide upon the outer face of the arcuate shaped contact member 22 carried upon the outer side of the annular flange 21 and thus cause the incandescent lamp bulb 25 carried within the lamp casing 27 to be illuminated and thus give the proper warning to the motorists in the front and rear of this particular vehicle. A spring 33 encircles the bearing sleeve 15 and has one end inserted within an opening provided therein while its opposite end is inserted within a slot provided within the inner end or hub of the hand wheel 17, and it will thus be noted that owing to the connections of the spring 33 with the bearing sleeve 15 and the inner end of the operating wheel 17 that the lamp casing or signal 27 will be caused to be moved into its normal inactive position.

In order to provide means which may be coupled with this invention in order that the operator of the vehicle may operate the signal or lamp casing 27 by a slight movement of his knee, I provide a knee pedal 34 having an arm 35 extending therefrom and which includes a collar 36 upon the upper end thereof and which is inserted over the inner end of the hand wheel 17 and by the use of a common set screw 37 the inner end of the hand wheel 17 and the collar 36 are held rigidly secured to the rotary shaft 16.

The invention is susceptible of various changes in its form, proportions and minor details of construction, and the right is herein reserved to make such changes as properly fall within the scope of the appended claim.

Having described my invention what is claimed is:

A signal of the character set forth including a fixed sleeve, a bearing sleeve arranged within and fixed to the inner side of the fixed sleeve, a rotary shaft arranged in the bearing sleeve, a hand operated wheel upon the inner end of the shaft, a collar fixed to the outer end of the rotary shaft and abutting the outer end of the bearing sleeve to limit the inward movement of the collar, a large annular flange on one end of the collar, a small similar flange upon the opposite end thereof, an illuminated lamp casing secured to the small annular flange on the collar, the large annular flange on the collar having a contact member arranged upon the inner side thereof, the outer end of the fixed sleeve having an annular flange thereon, a semi-circular spring contact member on the last mentioned annular flange and adapted to contact with the first mentioned contact member, a spring encircling the bearing sleeve with one end connected with the bearing sleeve and the other end connected to the hand operating wheel, means upon the lower end of the lamp casing and the annular flange on the fixed sleeve for restricting the lateral movement of the lamp casing, and a knee pedal having its upper end secured to the inner end of the hand operating wheel and its opposite end extending downwardly and in juxtaposition with the motor operator's knee.

In testimony whereof I affix my signature.

CHARLES STILES.